United States Patent [19]

Koyama et al.

[11] Patent Number: 5,436,399
[45] Date of Patent: Jul. 25, 1995

[54] THERMOPLASTIC POLYURETHANE DERIVED FROM POLYTETRAMETHYLENE CARBONATE DIOL

[75] Inventors: Masaoki Koyama, Yokosuka; Tomonari Watanabe, Yamato; Kenzou Kawai, Yokohama; Motoyoshi Mori, Kawasaki, all of Japan

[73] Assignee: Asahi Kasel Kogyo Kabushiki Kaisha, Osaka, Japan

[21] Appl. No.: 211,274

[22] PCT Filed: Sep. 29, 1993

[86] PCT No.: PCT/JP93/01394

§ 371 Date: Mar. 29, 1994

§ 102(e) Date: Mar. 29, 1994

[87] PCT Pub. No.: WO94/07934

PCT Pub. Date: Apr. 14, 1994

[30] Foreign Application Priority Data

Sep. 29, 1992 [JP] Japan .................... 4-258748

[51] Int. Cl.⁶ ............. C08G 18/10; C08G 18/32; C08G 18/60; C07C 69/96
[52] U.S. Cl. ..................... 528/59; 528/61; 528/62; 528/64; 528/65; 558/266; 428/423.1
[58] Field of Search ............ 528/59, 62, 64, 65, 528/61; 558/266; 428/423.1

[56] References Cited

U.S. PATENT DOCUMENTS

| | | | |
|---|---|---|---|
| 3,426,042 | 2/1969 | Hostettler et al. | 260/340.2 |
| 3,663,569 | 5/1972 | Lew | 260/340.2 |
| 4,440,937 | 4/1984 | Krimm et al. | 549/228 |

FOREIGN PATENT DOCUMENTS

| | | |
|---|---|---|
| B78030760 | 8/1978 | Japan . |
| A-55-056124 | 4/1980 | Japan . |
| A56063079 | 5/1981 | Japan . |
| A-57-117523 | 7/1982 | Japan . |
| A-59-100778 | 6/1984 | Japan . |
| A-59-100779 | 6/1984 | Japan . |
| W62501080 | 4/1987 | Japan . |
| B88012896 | 3/1988 | Japan . |
| B88029687 | 6/1988 | Japan . |
| A-3-111419 | 5/1991 | Japan . |

OTHER PUBLICATIONS

Polymer, vol. 33, No. 7, pp. 1384–1390 (1992).
Polymer, (Korea), Abstract, vol. 14, No. 5, pp. 487–496 (1990).

*Primary Examiner*—Paul R. Michl
*Assistant Examiner*—Patrick Niland
*Attorney, Agent, or Firm*—Jacobson, Price, Holman & Stern

[57] ABSTRACT

Disclosed is a thermoplastic polyurethane which is a prepolymer/chain extender reaction product having a number average molecular weight of from 30,000 to 200,000, and a gel content of 5% by weight or less, based on the weight of the thermoplastic polyurethane;

wherein the prepolymer is a prepolymer (A) comprising a polytetramethylene carbonate diol component (1) having a number average molecular weight of from 500 to 10,000 and an aliphatic diisocyanate component (2), the prepolymer (A) being represented by the following formula:

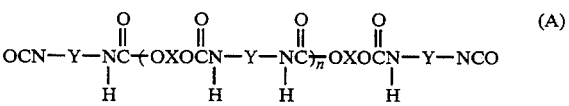

wherein:
X represents

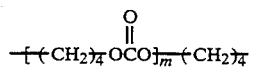

in which m is a number having an average value of from 3 to 85;
Y represents an aliphatic diisocyanate residue; and
n represents a number having an average value of from 1 to 50, and wherein the chain extender component is a chain exten-
(Abstract continued on next page.)

der (B) having an active hydrogen atom which is selected from the group consisting of a diol having a molecular weight of 300 or less, a diamine having a molecular weight of 300 or less, hydrazine and water. The thermoplastic polyurethane of the present invention has excellent resistance to light, hydrolysis, oleic acid and alcohol. Therefore, it can be advantageously used for preparing a coating composition, and for preparing a laminate synthetic leather and an impregnation composite artificial leather, which are obtained by processing a fibrous substrate with the coating composition.

12 Claims, 2 Drawing Sheets

THERMOPLASTIC POLYURETHANE DERIVED FROM POLYTETRAMETHYLENE CARBONATE DIOL

TECHNICAL FIELD

The present invention relates to a thermoplastic polyurethane. More particularly, the present invention is concerned with a novel thermoplastic polyurethane, derived from a polytetramethylene carbonate diol, which has excellent resistance to light, oleic acid, hydrolysis and alcohol, so that it is useful as a coating material, an adhesive, a molding latex material and the like. The present invention is also concerned with a coating composition comprising the thermoplastic polyurethane dissolved in an organic solvent therefor, and further concerned with a laminate synthetic leather and an impregnation composite artificial leather which are obtained by processing a fibrous substrate with the coating composition, the leathers exhibiting the above-mentioned excellent resistance properties. Moreover, the present invention is concerned with a novel process for preparing a polytetramethylene carbonate diol which is to be used for preparing such an excellent thermoplastic polyurethane.

BACKGROUND ART

A thermoplastic polyurethane has been appreciated for its excellent properties, such as high toughness, and high resistance to oil and abrasion, etc. The marketability thereof is increasing. However, conventional thermoplastic polyurethanes have drawbacks in that they do not exhibit satisfactory resistance to light, so that they are likely to suffer from being yellowed when used for a prolonged period of time. For example, in the use of molded polyurethane products as articles having a nature of fashion, such as watchbands and the like, the discoloration to yellow is a serious problem. For alleviating this problem of the discoloration occurring with a lapse of time, many of such articles have generally been produced in black color. Further, it has recently been found that when a thermoplastic polyurethane is used as a material for producing articles which are used in direct contact with human skin, such as watchbands, the polyurethane is deteriorated due to the action of oleic acid which is a sebum component contained in sweat. Therefore, it has been recognized that the resistance to oleic acid is an important property for polyurethanes to be used as materials for such articles. Other examples of such articles include automobile parts, such as a steering wheel, gear shift lever and the like.

Furthermore, a polyurethane type coating composition has been appreciated in the field of leathers, such as a laminate synthetic leather and an impregnation composite artificial leather, with respect to the abrasion resistance, feeling to the skin, appearance and the like, so that it has been widely used as materials for a variety of articles, such as shoes, bags, belts, gloves, furniture such as sofas, and automobile seats. However, most of polyurethanes used for these articles are of polyester type or polyether type, thereby causing various problems. For example, in the case of furniture, such as sofas and office chairs, automobile seats and the like, which are used in direct contact with human bodies for a long period of time, the surfaces thereof are deteriorated due to the hydrolysis of the polyester type polyurethane resin, thereby causing the surfaces to be tacky. Furthermore, in extreme cases, a phenomenon is observed such that polyurethane resin layers are deteriorated, so that the resin layers are peeled off from substrates thereof, thereby rendering difficult the use of the articles for a long period of time. With respect to the polyether type polyurethanes, they have excellent resistance to hydrolysis. However, they are poor in resistance not only to oleic acid, but also to alcohol. The resistance to alcohol is an extremely important property in the above-mentioned uses, because, for example, alcohol is usually contained in hairdressing agents. That is, by the use for a long period of time, polyether type polyurethane resin layers formed On articles are deteriorated, thereby rendering the articles useless. For solving these problems, the use of polycarbonate type polyurethanes derived from 1,6-hexanediol has been proposed (see Unexamined Japanese Patent Application Laid-Open Specification Nos. 56-63079, 59-100778 and 59-100779).

With respect to these polycarbonate type polyurethanes derived from 1,6-hexanediol, the polyurethanes obtained by using aromatic diisocyanates as a diisocyanate have improved resistance to hydrolysis, alcohol, oleic acid, etc., as compared to polyester type polyurethanes and polyether type polyurethanes, however, they are poor in resistance to light, thereby causing a marked discoloration to yellow and a quality deterioration thereof when used for a long time. On the other hand, the polyurethanes obtained by using aliphatic diisocyanates as a diisocyanate are improved in resistance to light and hydrolysis, but are not satisfactory in resistance to alcohol and oleic acid, so that problems remain unsolved with respect to the practical use thereof.

In addition, with respect to polycarbonate type polyurethanes, polycarbonate diols are expensive, leading to a big problem. It has been desired to develop polycarbonate diols which have excellent properties and are less costly and which, therefore, can be advantageously used in substitution for conventional polycarbonate diols, obtained using 1,6-hexanediol, which have generally been commercially produced and put on the market.

In these situations, the present inventors have made extensive and intensive researches with a view toward obviating the above-mentioned drawbacks inevitably accompanying the conventional thermoplastic polyurethanes. As a result, it has unexpectedly been found that when a polytetramethylene carbonate diol having a number average molecular weight of from 500 to 10,000, which is prepared using 1,4-butanediol as a starting material, and an aliphatic diisocyanate are employed as a polycarbonate diol and an organic diisocyanate, respectively, a thermoplastic polyurethane which has excellent resistance to all of light, hydrolysis, alcohol and oleic acid can be obtained.

With respect to polyurethanes derived from polytetramethylene carbonate diols, there are only a few reports. For example, in "Polymer, Vol. 33, No. 7, pp. 1384–1390, 1992", a crosslinked type polyurethane derived from a polytetramethylene carbonate diol is reported. However, this type of polyurethane has poor moldability when molded by injection molding, extrusion molding, etc. When this type of polyurethane is used as a component for a coating composition, the resultant coating composition has high viscosity, so that it cannot be put into practical use. Furthermore, when the polyurethane is used in the form of an emulsion, the emulsion is disadvantageously unstable. On the other hand, with respect to thermoplastic polyurethanes derived from polytetramethylene carbonate diols, reports can be found in Italian Patent No. 710,940 and "Polymer (Korea), Vol. 14, No. 5, pp. 487–496, 1990", in both of which 4,4'-diphenylmethanediisocyanate is used as an organic diisocyanate. This type of thermoplastic polyurethane has a disadvantage in that it is poor in resistance to light.

With respect to a process for preparing a polytetramethylene carbonate diol, which is used as one of the raw materials for preparing the thermoplastic polyurethane of the present invention, from 1,4-butanediol, there are known methods in which as in the case of preparing a commercially available polyhexamethylene carbonate diol, a transesterification is effected between 1,4-butanediol and a carbonate, such as a dialkyl carbonate, a diaryl carbonate or an alkylene carbonate, as disclosed in Unexamined Japanese Patent Application Laid-Open Specification No. 55-56124, Examined Japanese Patent Application Publication No. 63-12896, etc. However, when the reaction is conducted in accordance with these methods, a carbonate reacts with 1,4-butanediol or with a terminal group of a produced polymer having a low molecular weight to form tetrahydrofuran (hereinafter referred to as "THF") as a by-product, leading to a problem such that it is difficult to increase the molecular weight of a polytetramethylene carbonate diol to be prepared and, hence, the productivity is lowered. To solve these problems, it has been attempted to lower the reaction temperature. However, this attempt is accompanied by disadvantages in that butylene carbonate is likely to be by-produced, and that due to the formation of this by-product, it is difficult to increase the molecular weight of a desired polytetramethylene carbonate diol, so that the problem on the productivity remains unsolved. Further, due to the formation of by-product THF, not only does a reaction under a reduced pressure becomes difficult to perform, but also it becomes necessary to employ an additional equipment, such as an absorption column, for lowering the concentration of THF which is released into the air through a vacuum pump. No commercially advantageous process has been available for preparing a polytetramethylene carbonate diol.

As a result of the studies by the present inventors toward developing a commercially advantageous process for preparing a polytetramethylene carbonate diol which is a starting material for the thermoplastic polyurethane of the present invention, it has unexpectedly been found that when the above-mentioned transesterification reaction is conducted in the presence of an acidic compound, occurrence of side reactions is markedly suppressed, so that it advantageously becomes possible to prepare a polytetramethylene carbonate diol having a relatively high molecular weight in high yield on a commercial scale.

The present invention has been completed, based on these findings described above.

SUMMARY OF THE INVENTION

It is therefore an object of the present invention to provide a novel thermoplastic polyurethane having excellent resistance to all of light, hydrolysis, alcohol and oleic acid.

It is another object of the present invention to provide not only a coating composition comprising the above-mentioned thermoplastic polyurethane dissolved in an organic solvent therefor, the polyurethane having excellent resistance to all of light, hydrolysis, alcohols and oleic acid, but also a laminate synthetic leather and an impregnation composite artificial leather which are obtained by processing a fibrous substrate with the coating composition.

It is a further object of the present invention to provide a commercially advantageous process for preparing a polytetramethylene carbonate diol which is a starting material for the above-mentioned thermoplastic polyurethane.

The foregoing and other objects, features and advantages of the present invention will become apparent to those skilled in the art from the following detailed description and appended claims taken in connection with the accompanying drawings.

BRIEF DESCRIPTION OF THE DRAWINGS

In the accompanying drawings:

DETAILS

In accordance with the present invention, there is provided a thermoplastic polyurethane comprising:

a prepolymer component derived from a prepolymer (A) comprising a polytetramethylene carbonate diol component (1) having a number average molecular weight of from 500 to 10,000 and an aliphatic diisocyanate component (2), the prepolymer (A) being represented by the following formula:

wherein:

X represents in which m is a number having an average value of from 3 to 85;

Y represents an aliphatic diisocyanate residue; and n represents a number having an average value of from 1 to 50, and a chain extender component derived from a chain extender (B) having an active hydrogen atom which is selected from the group consisting of a diol having a molecular weight of 300 or less, a diamine having a molecular weight of 300 or less, hydrazine and water, the prepolymer (A) being chain extended with the chain extender (B), the thermoplastic polyurethane having the following properties:

a number average molecular weight of from 30,000 to 200,000, and a gel content of 5% by weight or less, based on the weight of the thermoplastic polyurethane.

The thermoplastic polyurethane of the present invention can be prepared, for example, by chain extending the prepolymer (A), which is obtained by reacting a polytetramethylene carbonate diol with an aliphatic diisocyanate, with a chain extender (B).

The polytetramethylene carbonate diol to be used for preparing the prepolymer (A) has a number average molecular weight of from 500 to 10,000, preferably from 800 to 5,000.

An aliphatic group of the aliphatic diisocyanate may be straight, branched or cyclic. The number of carbon atoms of the aliphatic group is preferably from 4 to 13. Examples of aliphatic diisocyanates having a straight aliphatic group include tetramethylene diisocyanate, pentamethylene diisocyanate, hexamethylene diisocyanate and octamethylene diisocyanate. Examples of aliphatic diisocyanates having a cyclic aliphatic group include 1-methylcyclohexylene-2,4-diisocyanate (hydrogenated TDI), 1,2-dimethylcyclohexylene-ω,ω-diisocyanate (hydrogenated XDI), isophorone diisocyanate (IPDI) and dicyclohexylmethane-4,4'-diisocyanate (hydrogenated MDI).

In connection with the above, it should be noted that when an aromatic diisocyanate is used in place of the above-mentioned aliphatic diisocyanate, the resultant polyurethane has markedly lowered resistance to light, leading to occurrences of discoloration and deterioration in mechanical strength, so that it cannot be put into practical use (see Comparative Examples 5 and 6 below).

Further, the prepolymer (A) is comprised of a polytetramethylene carbonate component and a diisocyanate component which are bonded together by urethane linkage, as shown in formula (1). The prepolymer (A) is a non-crosslinked type linear prepolymer which has isocyanate groups at both terminals thereof, and exhibits thermoplasticity. In formula (1), values of m and n are appropriately chosen, depending on the number average molecular weight (from 30,000 to 200,000) of the desired thermoplastic polyurethane.

The chain extender (B) can be selected from the group consisting of a diol having a molecular weight of 300 or less, a diamine having a molecular weight of 300 or less, hydrazine and water. Illustrative examples of chain extenders include diols, such as ethylene glycol, 1,4-butanediol, 1,5-pentanediol, neopentyl glycol and 1,6-hexanediol; diamines, such as ethylenediamine, propylenediamine, hexamethylenediamine, tolylenediamine, xylylenediamine, diphenyldiamine, diaminodiphenylmethane, diaminocyclohexylmethane, piperazine, 2-methylpiperazine and isophoronediamine; hydrazine and water.

With the use of the chain extender (B), the thermoplastic polyurethane of the present invention takes a non-crosslinked structure, thereby exhibiting thermoplasticity and good moldability. When the thermoplastic polyurethane of the present invention is used as a component for a coating composition, the resultant coating composition stably exhibits excellent coating performances. As described below in Comparative Example 11, when a crosslinking triol is used in place of the specific chain extender (B) to be used in the present invention, the viscosity of the reaction mixture is increased rapidly during the chain extending reaction, so that a stable coating composition cannot be obtained.

The ratio of the chain extender (B) to the prepolymer (A) can be appropriately selected, depending on the number average molecular weight of a desired thermoplastic polyurethane. In general, the molar ratio of the active hydrogen atoms in the chain extender (B) to the terminal NCO groups in the prepolymer (A) is from 2 to 0.5 (exclusive of unity), preferably from 1.2 to 0.8 (exclusive of unity).

As a process for preparing the thermoplastic polyurethane of the present invention, conventional techniques involving a urethane-forming reaction can be utilized. For example, there can be advantageously employed a so-called prepolymer method in which a polytetramethylene carbonate diol is reacted with an aliphatic diisocyanate to synthesize a polyurethane prepolymer (A) having terminal NCO groups and then, a chain extender (B) is added to increase the degree of polymerization, thereby obtaining a desired thermoplastic polyurethane having a high molecular weight.

In the reaction for preparing such a thermoplastic polyurethane, if desired, a conventional polymerization catalyst, such as a tertiary amine and an organic salt of a metal, e.g., tin or titanium, can be employed in an appropriate amount. For example, there can be employed a variety of conventional polymerization catalysts described in "Polyurethane Gijutsu (Polyurethane technology)" edited by Keiji Iwata, pp. 23–32, published by Nikkan Kogyo Shimbun, Ltd., Japan (1976).

The reaction for preparing a thermoplastic polyurethane can be conducted in a solvent inert to an aliphatic diisocyanate. Representative examples of solvents include dimethylformamide, diethylformamide, dimethyl sulfoxide, dimethylacetamide, tetrahydrofuran, methyl isobutyl ketone, dioxane, cyclohexanone, benzene and toluene. The above-mentioned solvents can be used individually or in combination.

In the thermoplastic polyurethane-forming reaction, if desired, a chain terminator can be used to block terminals of the polymer being formed. Examples of chain terminators include lower aliphatic monohydric alcohols, such as methanol and ethanol, and alkyl amines having from about 2 to about 12 carbon atoms, such as ethylamine, isopropylamine, diethylamine and 2-ethylhexylamine.

Furthermore, as another process for preparing the thermoplastic polyurethane of the present invention, there can be employed the following process. First, a prepolymer (A) is prepared in a solvent. Then, the prepared prepolymer (A) is emulsified and dispersed in water to obtain an emulsion. To the obtained emulsion is added a chain extender (B) to increase the degree of polymerization, followed by removing the solvent used. Thus, a thermoplastic polyurethane having a high molecular weight can be obtained in a latex form.

The thermoplastic polyurethane of the present invention has a number average molecular weight of from 30,000 to 200,000, preferably from 40,000 to 100,000. When the number average molecular weight is less than 30,000, the thermoplastic polyurethane has poor resistance to light and poor mechanical properties. For example, the resistance to light is markedly lowered, as described in Comparative Example 4 below. On the other hand, when the number average molecular weight exceeds 200,000, not only has the thermoplastic polyurethane poor processability, but also the viscosity of a coating composition comprising the thermoplastic polyurethane is markedly increased, so that the coating composition becomes unsuitable for practical use, as described in Comparative Example 10 below.

The thermoplastic polyurethane of the present invention has a gel content of 5% by weight or less, prefera- bly, substantially 0% by weight, based on the weight of the thermoplastic polyurethane. When the gel content exceeds 5% by weight, the thermoplastic polyurethane has poor processability, so that it is not suitable for practical use. Further, since the thermoplastic polyurethane has poor dissolvability for a solvent, a coating composition having a stable viscosity cannot be obtained.

The thermoplastic polyurethane of the present invention is substantially the same as a thermoplastic polyurethane which is a prepolymer/chain extender reaction product having a number average molecular weight of from 30,000 to 200,000, and a gel content of 5% by weight or less, based on the weight of the thermoplastic polyurethane;

wherein the prepolymer is a prepolymer (A) comprising a polytetramethylene carbonate diol component (1) having a number average molecular weight of from 500 to 10,000 and an aliphatic diisocyanate component (2), the prepolymer (A) being represented by the following formula:

wherein:
X represents in which m is a number having an average value of from 3 to 85;
Y represents an aliphatic diisocyanate residue; and
n represents a number having an average value of from 1 to 50, and wherein the chain extender component is a chain extender (B) having an active hydrogen atom which is selected from the group consisting of a diol having a molecular weight of 300 or less, a diamine having a molecular weight of 300 or less, hydrazine and water.

In another aspect of the present invention, there is provided a coating composition comprising the above-mentioned thermoplastic polyurethane dissolved in an organic solvent therefor.

As a coating composition of the present invention, a product comprising the thermoplastic polyurethane of the present invention which is produced in and emulsified in a solvent which is inert to the above-mentioned aliphatic diisocyanates, as such, can be used. However, for controlling the viscosity and dryability of the coating composition, there can be added an alcohol, such as ethanol, butanol or isopropanol (see, for example, Examined Japanese Patent Application Publication No. 63-29687).

For improving the resistance to heat and light and processability of the thermoplastic polyurethane and coating composition of the present invention, various conventional additives can be employed. Examples of additives include an antioxidant, such as a phenolic antioxidant, an amine-type antioxidant, a sulfur-containing antioxidant and a phosphorus-containing antioxidant; an ultraviolet absorber of, for example, a benzophenone type, a salicylate type, a benzotriazole type, a metal complex type or a hindered amine type; a reinforcing fiber, a filler, a colorant, a mold release agent and a flame retardant (see, for example, Unexamined Japanese Patent Application Laid-Open Specification No. H3-111419, which corresponds to DE P 3930 9995.9; Examined Japanese Patent Application Publication No. 53-30760 and Unexamined Japanese Patent Application Laid Open Specification No. 57-117523).

In a further aspect of the present invention, there is provided a laminate synthetic leather comprising a fibrous substrate and, directly or indirectly attached to at least one surface thereof, the above-mentioned thermoplastic polyurethane in a film form.

Figure 2:
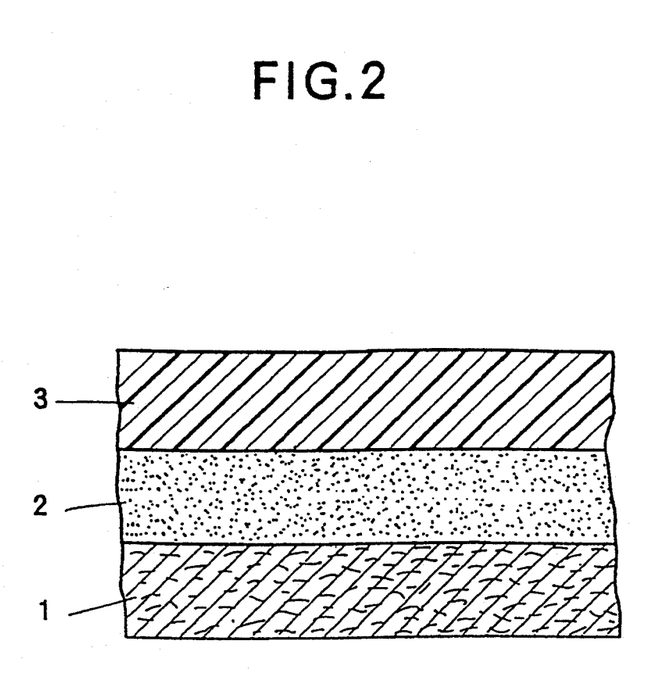
FIG. 2 shows a longitudinal cross-sectional view of the laminate synthetic leather (prepared in Example 12) obtained by coating a substrate with the coating composition of the present invention, followed by drying so that the coating becomes a surface layer of the synthetic leather.

The laminate synthetic leather of the present invention is obtained by a method in which the above-mentioned coating composition is applied to a fibrous Substrate (hereinafter simply referred to as "substrate") for a synthetic leather, followed by drying so that the applied coating composition forms a surface film layer, as illustrated in FIG. 2.

Examples of substrates include a knitted fabric or woven fabric made of natural fibers, such as cellulose fibers and regenerated cellulose fibers, or synthetic fibers, such as fibers of a polyester, nylon, vinylon and acrylate. The above-mentioned fibers can be used individually or in combination.

The laminate synthetic leather of the present invention can be produced by various conventional methods. For example, a coating composition may be directly applied to a substrate on at least one surface thereof. Alternatively, the coating composition may be indirectly applied to a substrate on at least one surface thereof. Illustratively stated, the coating composition can be applied to an adhesive layer which is formed directly on the substrate or formed on an intermediate layer, such as a layer of a polyurethane foam, fixedly disposed on the substrate. Then, a solvent contained in the coating composition applied is removed. In a further alternative method, a film is first prepared from the coating composition of the present invention. Then, the film is attached to a Substrate by an adhesive. In still a further alternative method, the coating composition of the present invention is applied to a release film to thereby obtain a polyurethane film. This polyurethane film is attached to the surface of a substrate by an adhesive layer, followed by removal of the release film, thus providing a laminate synthetic leather. Of the above-mentioned methods, the method in which a release film is used is most preferred.

Examples of adhesives include the coating composition of the present invention and other coating compositions comprising other types of polyurethane resins. These coating compositions may be mixed with a hardener, such as a polyisocyanate.

As a method for adhering the polyurethane film made from the coating composition of the present invention to the substrate, there can be mentioned a method in which an adhesive is applied to a substrate or a polyurethane film and then, the substrate and the polyurethane film are attached to each other through the adhesive, followed by evaporation of a solvent contained in the coating composition, and a method in which an adhesive is applied to both of a substrate and a polyurethane film, followed by evaporation of a solvent contained in the coating composition and then, the substrate and the polyurethane film are pressure-bonded to each other.

As examples of release films to be used in the present invention, there can be mentioned silicone, polypropylene and polyester release films.

In still a further aspect of the present invention, there is provided an impregnation composite artificial leather comprising a fibrous substrate and, substantially uniformly filled in interstices between fibers thereof, the above-mentioned thermoplastic polyurethane, wherein the thermoplastic polyurethane bonds the fibers together.

Differing from the above-mentioned laminate synthetic leather having a fibrous substrate surface covered with a thermoplastic polyurethane, the impregnation composite artificial leather of the present invention is obtained by impregnating a fibrous substrate with the coating composition comprising the thermoplastic polyurethane of the present invention dissolved in an organic solvent therefor, so that the thermoplastic polyurethane as a solid component of the coating composition is retained in interstices between fibers of the fibrous substrate as a solid material, thereby providing a structure in which the thermoplastic polyurethane is filled substantially uniformly in interstices between the fibers of the fibrous substrate, wherein the thermoplastic polyurethane bonds the fibers together.

As a fibrous substrate for the impregnation composite artificial leather, for example, a non-woven fabric which surface is napped (hereinafter referred to as "napped non-woven fabric") can be used. As a napped non-woven fabric, there can be used one form of entangled sheet obtained by entangling very fine fibers only which can form a napped portion, or another form of entangled sheet obtained by providing a laminate structure in which a fabric of very fine fibers and a knitted fabric or a woven fabric as a reinforcing material are laminated, and entangling the fibers of both fabrics.

The material and length of the very fine fibers can be appropriately chosen. However, the fineness of the very fine fibers is preferably 0.5 denier or less, so that a delicate nuance and a lighting effect of a surface appearance of a suede-like or nubac-like sheet can be obtained. The material for the very fine fibers is preferably polyester, polyamide, polyacrylonitrile, cellulose, cuprammonium rayon and the like. It is preferred that the very fine fibers partially contain polyvinyl alcohol (PVA) fibers which can be dissolution-removed by post-treatment. With respect to the length of the very fine fibers, an appropriate length can be chosen, depending on the desired type of a fibrous substrate. That is, short staples having a length of from 1 to 50 mm, long staples having a length of 100 mm or more, or substantially long staples can be chosen. These very fine fibers can be obtained by conventional methods, such as island-in sea bicomponent fiber method, blend bicomponent fiber method, direct spinning method, melt-blowing method and spun-bonding method.

On the other hand, as preferred examples of knitted fabrics and woven fabrics for reinforcing the above-mentioned very fine fibers, there can be mentioned knitted fabrics, such as a weft knitted fabric and a tricot, and woven fabrics having a plain weave structure. As yarns for these fabrics, a straight yarn and a pre-twisted yarn are preferred.

The impregnation composite artificial leather of the present invention can be produced by various conventional methods. For example, a non-woven fabric is first prepared by the random webber method, cross layer method or wet-laid method using very fine fibers partially containing PVA fibers which can be dissolution-removed by post-treatment. Subsequently, needle punching or high pressure water jet is applied to entangle the very fine fibers with one another, thereby obtaining a napped, entangled sheet comprised of the very fine fibers. Alternatively, non-woven fabrics are first prepared from very fine fibers and then, a knitted and/or a woven fabric is inserted between the nonwoven fabrics to form a laminate structure. Subsequently, the very fine fibers of the non-woven fabric and the fibers of the knitted fabric and/or the woven fabrics are entangled with each other to thereby obtain a napped, entangled sheet comprised of the very fine fibers and the knitted fabric and/or the woven fabric.

Then, the napped, entangled sheet is coated with an aqueous carboxymethyl cellulose (CMC) solution to protect the napped portions and then, immersed in the coating composition of the present invention. The PVA fibers and CMC contained in the napped, entangled sheet are extraction-removed and then, the sheet is dried to obtain an impregnation composite artificial leather.

In still a further aspect of the present invention, there is provided a commercially advantageous process for preparing a polytetramethylene carbonate diol which is a starting material for producing the thermoplastic polyurethane of the present invention. That is, a process is provided for preparing a polytetramethylene carbonate diol represented by the following formula:

wherein p is a number having an average value of from 3 to 85,
which comprises reacting 1,4-butanediol with a carbonate selected from the group consisting of a dialkyl carbonate, a diaryl carbonate and an alkylene carbonate in the presence of an acidic compound.

Examples of dialkyl carbonates include dimethyl carbonate, diethyl carbonate and dibutyl carbonate. Examples for diaryl carbonates include diphenyl carbonate and dinaphthyl carbonate. Examples for alkylene carbonates include ethylene carbonate and propylene carbonate. These carbonates can be used individually or in combination.

In the process of the present invention, the molar ratio of the 1,4-butanediol to the carbonate is generally in the range from 10:1 to 1:10, preferably from 1:2 to 2:1.

The reaction scheme for preparing a polytetramethylene carbonate diol can be represented, for example, by the following formula (2) or (2').

wherein:
each of X and Y independently represents an alkoxy group or a phenoxy group;
a, b, c, d and e are constants which are stoichiometrically determined;
p represents a number having an average value of from 3 to 85; and
q represents an integer.

Each of these reactions is a transesterification between the 1,4-butanediol and the carbonate. Since the transesterification is an equilibrium reaction, the reaction is advanced by removing the produced alcohol from the reaction system. By-products of these reactions include tetrahydrofuran (THF) and butylene carbonate (BC) which is a cyclic carbonate formed from 1,4-butanediol. It is considered that these by-products are formed via the following two pathways. In pathway 1, which is represented by the following formula (3) or (3'), THF and BC are formed from 1,4-butanediol and a carbonate by direct decarboxylation or direct cyclization. These side reactions are dominant at an early stage of the reaction, in which the concentrations of the 1,4-butanediol and the carbonate are relatively high.

wherein:
each of X and Y independently represents an alkoxy group or a phenoxy group;
a, b, c, d and e are constants which are stoichiometrically determined; and
q represents an integer.

On the other hand, in pathway 2, which is represented by the following formula (4), the terminal portion of the polytetramethylene carbonate diol produced from 1,4-butanediol and a carbonate are cyclized, or cyclized and decarboxylated, to thereby form by-products. Pathway 2 is dominant at a later stage of the reaction in which the concentration of the produced polymer is relatively high.

wherein:
p represents a number having an average value of from 3 to 85.

As is apparent from formulae (3), (3') and (4), in the reactions for preparing polytetramethylene carbonate diols, the rate of the reaction is lowered at the early stage of reaction due to the side reactions, whereas the terminal portion of the polytetramethylene carbonate diol produced is cleaved away at the later stage of reaction due to the side reactions. As a result, it is difficult to increase the molecular weight of the polymer being produced, so that the desired polytetramethylene carbonate diol cannot be efficiently prepared.

The reason for these side reactions has not yet been elucidated in detail. However, it is presumed that the side reactions occur due to the decomposition of the polymer being produced, which decomposition is caused by heat, and a trace metal and a trace alkali which are present in the reaction system, and due also to the promotion of the decomposition by a catalyst used. For suppressing these side reactions, there can be conceived a method in which the reaction temperature is lowered, or a method in which the reaction is conducted without using a catalyst. However, these methods are not practical since the rate of the reaction is lowered. On the other hand, there can also be conceived a method in which trace components are removed. However, this method is not considered to be effective for satisfactorily suppressing the formation of the by-products since the side reactions are caused mainly by thermal decomposition of the polymer being formed.

However, as demonstrated in Examples 1 to 6 and Comparative Examples 1 to 3 below, it has surprisingly been found that by the addition of an acidic compound to the reaction system, the occurrence of side reactions at a high temperature is suppressed, and especially the side reaction via the pathway represented by the above formula (4) is completely obviated (although the mechanism has not yet been elucidated), so that the amount of THF formed as a by-product is markedly decreased, thus advantageously rendering it possible to produce a polytetramethylene carbonate diol having a number average molecular weight of from 500 to 10,000 [corresponding to a polytetramethylene carbonate diol of the above formula (1) in which p is from 3 to 85, preferably from 500 to 5,000] in high yield on a commercial scale.

As illustrative modes of the process of the present invention for preparing a polytetramethylene carbonate diol, the following three mode can be mentioned.

In a first mode, 1,4-butanediol is reacted with and a carbonate in the presence of an acidic compound as shown in the above formula (2) or (2').

In a second mode, a polytetramethylene carbonate diol having a number average molecular weight of from 300 to 1000 is prepared by reacting 1,4-butanediol with carbonate and then, unreacted monomers are removed, whereupon the above prepared polytetramethylene carbonate diol is reacted with a carbonate in the presence of an acidic compound as shown in the following formula (5) or (5'):

wherein:
- each of X and Y independently represents an alkoxy group or a phenoxy group;
- a, b, c, d and e are constants which are stoichiometrically determined;
- r represents a number having an average value of from 2 to 8;
- p represents a number having an average value of from 3 to 85; and
- q is an integer.

In a third mode, a polytetramethylene carbonate diol having a low molecular weight (300 to 1000) is subjected to self-condensation reaction in the presence of an acidic compound as shown in the following formula (6) and (6'):

wherein:
- each of X and Y independently represents an alkoxy group or a phenoxy group;
- a, b, c, d and e are constants which are stoichiometrically determined;
- r represents a number having an average value of from 2 to 8;
- p represents a number having an average value of from 3 to 85; and
- q represents an integer.

Any of the above-mentioned modes can be employed. It is important that the reaction be conducted in the presence of an acidic compound.

In the above process for the synthesis of a polytetramethylene carbonate diol, it is preferred that the reaction be conducted in a reaction vessel provided with a distillation column, so that by-produced alcohols can be selectively removed from the reaction system.

The reaction temperature is varied, depending on the type of the mode to be employed, but the reaction temperature is preferably selected in the range from 80° to 200° C. from a viewpoint of the suppression of side reactions at the early stage of reaction in which a large amount of 1,4-butanediol is present, whereas the reaction temperature is preferably selected in the range from 120° to 250° C. at the later stage of reaction in which the concentration of the polymer increases.

The reaction pressure is appropriately selected in the range from atmospheric pressure to 0.1 mmHg so that the by-produced alcohols can be effectively removed.

The reaction can be conducted in any of a batch system, a semi-batch system and a continuous system.

Examples of acidic compounds to be used in the process of the present invention for preparing a polytetramethylene carbonate diol include phosphoric acid, phosphonic acid, acid phosphoric ester, phosphonic ester and phosphoric ester. More specifically, there can be mentioned phosphoric acid; phosphonic acid; phosphonic ester, such as methyl phosphonate, dimethyl phosphonate, ethyl phosphonate, diethyl phosphonate, propyl phosphonate, dipropyl phosphonate, isopropyl phosphonate, diisopropyl phosphonate, butyl phosphonate, dibutyl phosphonate, lauryl phosphonate, dilauryl phosphonate, stearyl phosphonate, distearyl phosphonate, dibenzyl phosphonate, dioctyl phosphonate, dioleyl phosphonate and diphenyl phosphonate; and phosphoric ester, such as dibenzyl phosphate, di-n-butyl phosphate, dicetyl phosphate, didecyl phosphate, di(2-ethylhexyl)phosphate, di-n-hexadecyl phosphate and diphenyl phosphate.

The amount of an acidic compound to be added is generally in the range from 1 to 10,000 ppm, preferably from 5 ppm to 500 ppm, based on the total weight of the starting materials (for example, the total weight of 1,4-butanediol and a carbonate in the case of the method represented by formula (2) or (2′). When the amount of the acidic compound exceeds 10,000 ppm, the reaction is inhibited, while when the amount of the acidic compound is less than 1 ppm, the effect of inhibiting the side reactions cannot be exerted.

Further, an acidic compound may be added to the reaction system at one time or continuously during the reaction. It can be added at any stage of the reaction, but it is generally effective to add the acidic compound during the reaction between the middle stage and the last stage in which the concentration of the polymer becomes high.

Although the reaction for preparing a polytetramethylene carbonate diol proceeds even in the absence of a catalyst, the reaction can also be conducted in the presence of a catalyst. As a catalyst, conventionally known catalysts for transesterification reactions can be used (see, for example, U.S. Pat. Nos. 4,440,937, 3,426,042, 3,663,569, Unexamined Japanese Patent Laid-Open Specification No. 55-56124 and Examined Japanese Patent Publication No. 62-501080). Examples of catalysts include lead compounds, such as lead acetate, zinc oxide diethoxylead and dipropoxy lead; titanium compounds, such as titanium tetrapropoxide and titanium tetrabutoxide; metals, such as sodium, potassium, lithium, rubidium, cesium, magnesium, calcium, strontium, barium, aluminum, cobalt, germanium, cerium, manganese, antimony, tin and zinc; and salts, oxides, complexes and alkoxides of these metals.

The amount of the catalyst to be added is generally in the range from 1 to 1,000 ppm, preferably from 5 to 500 ppm, based on the total weight of 1,4-butanediol and a carbonate.

The polytetramethylene carbonate diol obtained by the process of the present invention can be used not only as a starting material for the thermoplastic polyurethane of the present invention, but also as a soft segment for thermoplastic elastomers and as a plasticizer for polymers.

BEST MODE FOR CARRYING OUT THE INVENTION

The present invention will be described in greater detail with reference to the following Examples and Comparative Examples, which should not be construed as limiting the scope of the present invention. In the Examples and Comparative Examples, "part" is by weight, unless otherwise indicated.

The properties of each of thermoplastic polyurethanes obtained in Examples were determined according to the following methods.

(1) Resistance to Light

A thermoplastic polyurethane sample (having a width of 10 mm, a length of 60 mm and a thickness of 100 μm) was subjected to exposure testing by means of a fade-o-meter (manufactured and sold by Suga Shikenki Co., Japan) at 63° C. for 100 hours. The sample was taken out to measure the degree of discoloration to yellow (AE value) by a color difference meter (CR-200, manufactured and sold by Minolta Camera Co., Ltd., Japan). The film strength retention ratio was calculated by the following formula using values which were measured according to JIS K-7311 under the following conditions.

Measuring instrument: TENSILON-type tensile tester (RTA-100, manufactured and sold by Orientech Co., Japan)
Holding length: 30 mm
Stretching rate: 300 mm/min
Atmosphere: 25° C., relative humidity (RH) of 65%

$$\text{Film strength Retention Ratio (\%)} = \frac{\text{Film strength after exposure by fade-o-meter (kg/cm}^2\text{)}}{\text{Film strength before exposure by fade-o-meter (kg/cm}^2\text{)}} \times 100$$

(2) Resistance to Oleic Acid

A thermoplastic polyurethane sample (having a width of 10 mm, a length of 60 mm and a thickness of 100 μm) was immersed in oleic acid at room temperature for one week. The swelling ratio and the film strength retention ratio were calculated by the following formulae, respectively.

$$\text{Swelling Ratio (\%)} = \frac{[\text{Weight after immersion (g)} - \text{Weight before immersion (g)}]}{\text{Weight before immersion (g)}} \times 100$$

$$\text{Film strength Retention Ratio (\%)} = \frac{\text{Film strength after immersion (kg/cm}^2\text{)}}{\text{Film strength before immersion (kg/cm}^2\text{)}} \times 100$$

The determination of the film strength retention ratio was made using values which were measured according to JIS K-7311 under the same conditions as in the determination of the above-mentioned (1) resistance to light.

(3) Resistance to Alcohol

A thermoplastic polyurethane sample (having a width of 10 mm, a length of 60 mm and a thickness of 100 μm) was immersed in ethanol at room temperature for one week. The determination of the swelling ratio and the film strength retention ratio were made using values which were measured under the same conditions as in the above-mentioned (2) resistance to oleic acid.

(4) Resistance to Hydrolysis

A thermoplastic polyurethane sample (having a width of 10 mm, a length of 60 mm and a thickness of 100 μm) was immersed in hot water at 100° C. for one week. The molecular weight was measured by gel permeation chromatography (GPC). The molecular weight retention ratio was calculated by the following formula:

$$\text{Molecular Weight Retention Ratio} = \frac{\text{Molecular weight of the film after immersion}}{\text{Molecular weight of the film before immersion}} \times 100$$

(5) Number Average Molecular Weight of Thermoplastic Polyurethane

1% by weight solution of a thermoplastic polyurethane sample in dimethylformamide (DMF) was prepared. The number average molecular weight was measured by GPC under conditions described below.

Column: Shodex KD-804 and DD 805 (Connected in series), manufactured and sold by Showa Denko K.K., Japan Column Oven: CTO-6A, manufactured and sold by Shimadzu Co., Japan Temperature: 40° C.

Flow Rate: 1 ml/min

Detector: Differential refractometer (RID-6A, manufactured and sold by Shimadzu Co., Japan)

Data Processing Instrument: CP-8000, manufactured and sold by Tosoh Co., Japan (6) Gel Content of Thermoplastic Polyurethane 10 g of a thermoplastic polyurethane sample was weighed in a 200-ml flask and then, 90 g of DMF was added thereto. The mixture was subjected to shaking by means of a shaker of which the temperature was set at 50° C., followed by filtration by a 400-mesh metallic sieve to obtain an undissolved portion thereof. The thus obtained undissolved portion was dried and then, measured with respect to the weight thereof. The gel content was calculated by the following formula:

Gel Content (% by weight) = [Weight of undissolved portion (g)/10(g)] × 100

EXAMPLE 1

Step (1)

In a 3-liter reaction vessel provided with a stirrer, a thermometer and a fractionating column were charged 1584 g (18 moles) of ethylene carbonate, 1440 g (16 moles) of 1,4-butanediol and 3 mg of lead acetate and then, a reaction was allowed to proceed at 130° C. under a pressure of 17 to 35 mmHg for 10 hours. During the course of the reaction, unreacted ethylene carbonate and ethylene glycol as a by-product were distilled off as an azeotropic mixture thereof from the top of the fractionating column. It was observed that in the cold trap, tetrahydrofuran (hereinafter referred to as "THF") was formed in a quantity of 2 mole %, based on the amount of the 1,4-butanediol charged.

Step (2)

Then, the pressure of the reaction vessel was returned to the atmospheric pressure, and 317 g (3.6 moles) of ethylene carbonate was added to the vessel. The temperature of the vessel was elevated to 150° C. and then, a reaction was allowed to proceed under a pressure of 17 to 35 mmHg for 8 hours. In this step too, during the course of the reaction, unreacted ethylene carbonate and ethylene glycol as a by-product were distilled off as an azeotropic mixture from the top of the fractionating column. In the cold trap, THF was formed in a quantity of 2 mole %, based on the amount of the 1,4-butanediol charged. At the same time, 1800 g of polytetramethylene carbonate diol was formed in the reaction vessel. The number average molecular weight of the formed polytetramethylene carbonate diol was measured by GPC and found to be about 1500. The hydroxyl value was 77.3 mg.KOH/g.

Step (3)

Then, the pressure of the reaction vessel was returned to the atmospheric pressure again, and 0.1 g of di(2-ethylhexyl)phosphate was added as an acidic compound to the vessel. The fractionating column was removed so that any volatile components can be directly withdrawn from the reaction vessel. The temperature of the reaction vessel was elevated to 150° C. and the pressure of the reaction vessel was reduced to 6 mmHg. The reaction vessel was maintained at such temperature and pressure conditions for 1 hour, to thereby remove unreacted monomers from the reaction vessel.

Step (4)

Figure 1:
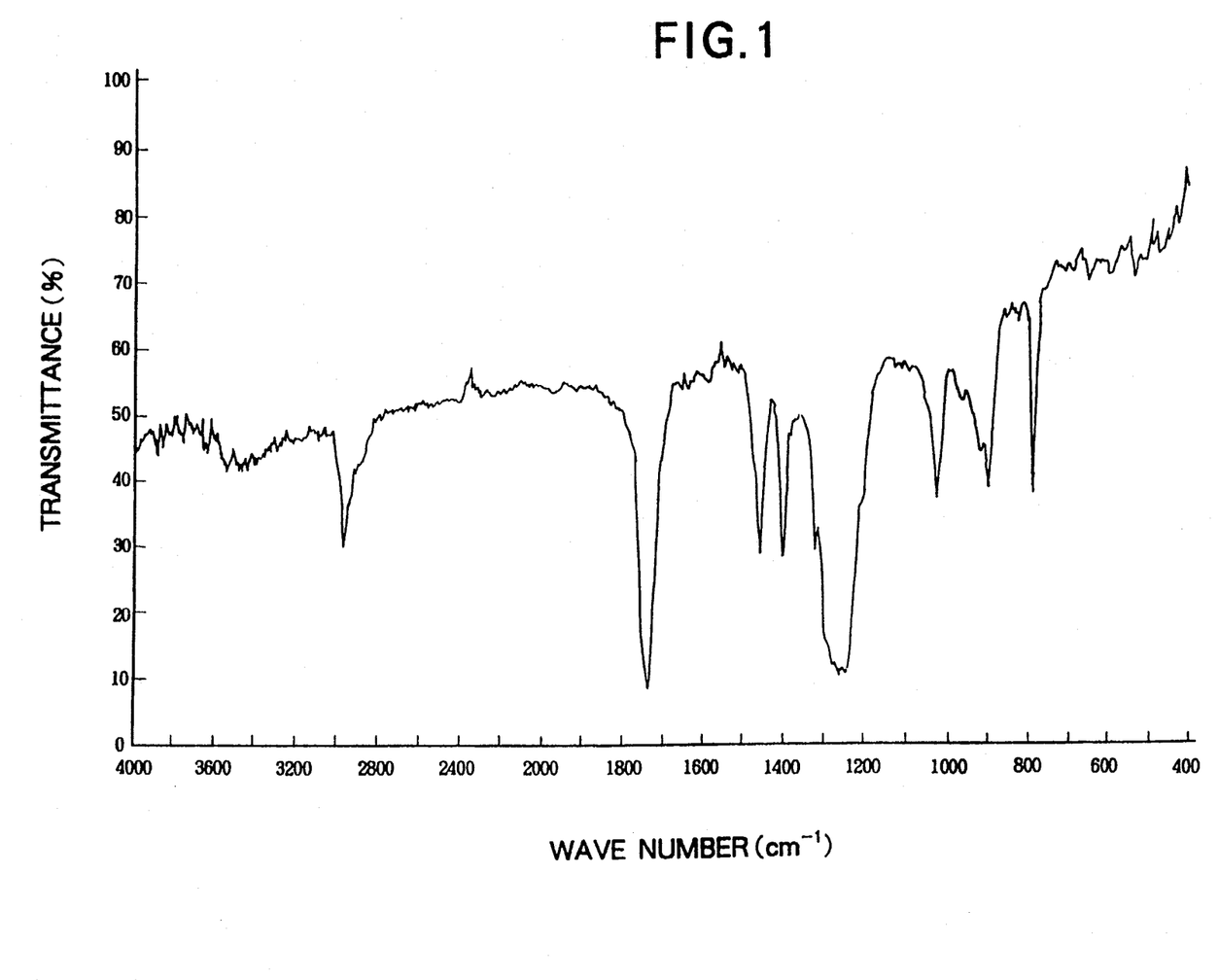
FIG. 1 shows an IR spectrum of the polytetramethylene carbonate diol obtained in Example 1.

Subsequently, the temperature of the reaction vessel was elevated to 190° C., while reducing the pressure to 4 mmHg, so that a reaction was allowed to proceed for 5 hours, while distilling off 1,4-butanediol, thereby obtaining 1740 g of polytetramethylene carbonate diol having a number average molecular weight of 2050 (hydroxyl value = 54.6 mg.KOH/g). At that time, THF was formed as a by-product in a quantity of 1 mole %, based on the amount of the 1,4-butanediol charged. The total quantity of THF formed as a by-product in the reactions of the overall procedure was 5 mole %, based on the amount of the 1,4-butanediol charged. FIG. 1 indicates an IR spectrum of the finally obtained polytetramethylene carbonate diol.

COMPARATIVE EXAMPLE 1

Substantially the same procedure as described in Example 1 was repeated except that di(2-ethylhexyl)phosphate was not added in step (3), to thereby prepare polytetramethylene carbonate diol.

The quantity of THF which was formed as a by-product in step (1) was 2 mole %, based on the amount of the 1,4-butanediol charged.

In step (2), 1820 g of polytetramethylene carbonate diol was formed. The number average molecular weight of the formed polytetramethylene carbonate diol was 1450 (hydroxyl value = 80 mg.KOH/g). The quantity of THF which was formed as a by-product was 4 mole %, based on the amount of the 1,4-butanediol charged.

In step (3), the addition of di(2-ethylexyl)phosphate was omitted as described above. The fractionating column was removed and then, unreacted monomers were removed from the reaction vessel.

In step (4), it was attempted to conduct a reaction at 190° C. under a pressure of 4 mmHg. However, a large quantity of THF was formed as a by-product, so that the pressure did not become lower than 6 mmHg. Therefore, the reaction was conducted under a pressure of 6 mmHg for 10 hours, while distilling off 1,4-butanediol.

The quantities of THF formed as a by-product at the time of the separation of monomers and at the time of the distilling off of 1,4-butanediol were, respectively, 4 mole % and 8 mole %, based on the amount of the 1,4-butanediol charged.

1530 g of polytetramethylene carbonate diol having a number average molecular weight of 1500 (hydroxyl value = 77.3 mg.KOH/g) was obtained. The reaction was further conducted. However, decomposition of the polymers vigorously occurred, so that it was difficult to achieve further polymerization. The total amount of THF formed as a by-product in the reactions of the overall procedure was 18 mole %, based on the amount of the 1,4-butanediol charged.

EXAMPLE 2

Substantially the same procedure as described in Example 1 was repeated except that 0.5 g (5 times the amount in Example 1) of di(2-ethylhexyl)phosphate was added. In the course of the reaction, unreacted ethylene carbonate and ethylene glycol formed as a by-product were distilled off as an azeotropic mixture from the top of the fractionating column, while THF formed as a by-product was collected in a cold trap. 1800 g of polytetramethylene carbonate diol having a number average molecular weight of 1480 was formed in a reaction vessel. The quantity of THF formed as a by-product was 4 mole %, based on the amount of the 1,4-butanediol charged.

Then, the fractionating column was removed so that any volatile components can be directly withdrawn from the reaction vessel. The pressure of the reaction vessel was reduced to 6 mmHg. The reaction vessel was maintained at such temperature and pressure conditions for 1 hour, to thereby remove unreacted monomers from the reaction vessel.

Subsequently, the temperature of the reaction vessel was elevated to 190° C., while reducing the pressure to 4 mmHg. A reaction was allowed to proceed for 5 hours, while distilling off 1,4-butanediol, thereby obtaining 1710 g of polytetramethylene carbonate diol having a number average molecular weight of 2150 (hydroxyl value=52.1 mg-KOH/g). At that time, THF was formed as a by-product in a quantity of 0.4 mole %, based on the amount of the 1,4-butanediol charged. The total quantity of THF formed as a by-product in the reactions of the overall procedure was 4.4 mole %, based on the amount of the 1,4-butanediol charged.

EXAMPLE 3

Substantially the same procedure as described in Example 1 was repeated except that, after removing unreacted monomers from the reaction vessel, the reaction conditions of temperature, pressure and time in step (4) were changed to 200° C., 3 mmHg and 10 hours, respectively. As a result, 1500 g of polytetramethylene carbonate diol having a number average molecular weight of 3500 (hydroxyl value=32 mg.KOH/g) was obtained. The total quantity of THF formed as a by-product in the reactions of the overall procedure was 5.5 mole %, based on the amount of the 1,4-butanediol charged.

EXAMPLE 4

Substantially the same procedure as described in Example 1 was repeated except that 0.2 g of di-n-hexadecyl phosphate was used as an acidic compound. As a result, 1700 g of polytetramethylene carbonate diol having a number average molecular weight of 1900 (hydroxyl value=58.9 mg.KOH/g) was obtained. The total quantity of THF formed as a by-product in the reactions of the overall procedure was 4.8 mole %, based on the amount of the 1,4-butanediol charged.

EXAMPLE 5

Substantially the same procedure as described in Example 1 was repeated except that 0.2 g of phosphonic acid was used as an acidic compound. As a result, 1730 g of polytetramethylene carbonate diol having a number average molecular weight of 2000 (hydroxyl value=58.0 mg.KOH/g) was obtained. The total quantity of THF formed as a by-product in the reactions of the overall procedure was 4.9 mole %, based on the amount of the 1,4-butanediol charged.

EXAMPLE 6

200 g of polytetramethylene carbonate diol having a number average molecular weight of 1500 obtained in Comparative Example 1 was charged in a 500-ml eggplant shaped flask and then, added thereto 10 mg of di(2-ethylhexyl)phosphate as an acidic compound. A reaction was allowed to proceed at 190° C. under a pressure of 3 mmHg for 2 hours, while distilling off 1,4-butanediol. As a result, 190 g of polytetramethylene carbonate diol having a number average molecular weight of 2500 (hydroxyl value=46.4 mg.KOH/g) was obtained.

COMPARATIVE EXAMPLE 2

Substantially the same procedure as described in Example 6 was repeated except that di(2-ethylhexyl)phosphate was not added. As a result, 5 g of THF was formed as a by-product, while an increase in number average molecular weight of polytetramethylene carbonate diol was not observed.

COMPARATIVE EXAMPLE 3

Substantially the same procedure as described in Example 6 was repeated except that di(2-ethylhexyl)phosphate was not added, and that in step (4), the reaction conditions of temperature, pressure and time were changed to 200° C., 2 mmHg, and 10 hours, respectively. As a result, 10 g of THF was formed as a by-product, while an increase in number average molecular weight of polytetramethylene carbonate diol was not observed.

EXAMPLE 7

205 parts of polytetramethylene carbonate diol obtained in Example 1 and 100.8 parts of hexamethylene diisocyanate were charged in a reaction vessel provided with a stirrer, a thermometer and a cooling column. A reaction was conducted at 100° C. for 4 hours to obtain a prepolymer having terminal NCO groups. To the prepolymer were added 44.63 parts of 1,4-butanediol as a chain extender, 0.60 part of n-butanol as a chain terminator and 0.007 part of dibutyltin dilaurate as a catalyst. A reaction was conducted at 170° C. for 2 hours in a universal extruder for use in a laboratory provided with a kneader (Extruder for lab test KR-35 manufactured and sold by Kasamatsu Kako Research Co., Japan) to thereby obtain a polyurethane. Then, the thus obtained polyurethane was extruded by means of a screw type extruder to obtain strands thereof. Further, the obtained strands were formed into pellets by means of a pelletizer. It was found that the thus obtained polyurethane pellets had a number average molecular weight of 85,000 and a gel content of 0% by weight, based on the weight of the polyurethane. A 100 μm-thick sheet of the polyurethane was prepared by subjecting the pellets to compression molding. From the thus prepared sheet, test pieces for measurement of resistance to light were prepared. The results of measurement are shown in Table 1.

EXAMPLE 8

205 parts of polytetramethylene carbonate diol obtained in Example 1, 52.4 parts of dicyclohexylmethane-4,4'-diisocyanate (hydrogenated MDI) and 0.013 part of dibutyltin dilaurate as a catalyst were charged in a reaction vessel provided with a stirrer, a thermometer and a cooling column. A reaction was conducted at a temperature of 120° C. for 4 hours to obtain a prepolymer having terminal NCO groups. To the obtained prepolymer were added 8.15 parts of 1,4-butanediol as a chain extender and 1.5 parts of n-butanol as a chain terminator. A reaction was conducted for 3 hours at 170° C. in a universal extruder for use in a laboratory provided with a kneader (Extruder for lab test KR-35 manufactured and sold by Kasamatsu Kako Research Co., Japan) to thereby obtain a polyurethane. Then, the thus obtained polyurethane was extruded by means of a screw type extruder to obtain strands thereof. Further, the obtained strands were formed into pellets by means of a pelletizer. It was found that the thus pelletized polyurethane had a number average molecular weight of 80,000 and a gel content of 0% by weight, based on the weight of the polyurethane. A 100 μm-thick sheet of the polyurethane was prepared by subjecting the pellets to compression molding, to thereby obtain test pieces for measurement of resistance to light. The results of measurement are shown in Table 1.

EXAMPLE 9

Substantially the same procedure as described in Example 7 was repeated except that 44.21 parts of 1,4-butanediol and 1.28 parts of n-butanol were used, to thereby obtain pellets of polyurethane having a number average molecular weight of 40,000 and a gel content of 0% by weight, based on the weight of the polyurethane. A 100 μm-thick sheet of the polyurethane was prepared by subjecting the pellets to compression molding, to thereby obtain test pieces for measurement of resistance to light. The results of measurement are shown in Table 1.

COMPARATIVE EXAMPLE 4

Substantially the same procedure as described in Example 7 was repeated except that 43.42 parts of 1,4-butanediol and 2.60 parts of n-butanol were used, to thereby obtain pellets of polyurethane having a number average molecular weight of 20,000 and a gel content of 0% by weight, based on the weight of the polyurethane. A 100 μm-thick sheet of the polyurethane was prepared by subjecting the pellets to compression molding, to thereby obtain test pieces for measurement of resistance to light. The results of measurement are shown in Table 1.

COMPARATIVE EXAMPLE 5

679.6 parts of polytetramethylene carbonate diol obtained in Example 1 and 110.5 parts of 4,4'-diphenylmethane diisocyanate (MDI) were charged in a reaction vessel provided with a stirrer, a thermometer and a cooling column. A reaction was conducted at 60° C. for 2 hours to obtain a prepolymer having terminal NCO groups in a solution form. The prepolymer solution was heated at 80° C. and then, mixed with 8.15 parts of 1,4-butanediol as a chain extender and 1.5 parts of n-butanol as a chain terminator, both kept at room temperature, by means of a two-fluid mixer (TT-1001 manufactured and sold by Automachine Development Co., Japan), to thereby obtain a polyurethane. Then, the thus obtained polyurethane was extruded by means of a screw type extruder heated at 120° C. of a universal extruder for use in a laboratory provided with a kneader (Extruder for lab test KR-35 manufactured and sold by Kasamatsu Kako Research Co., Japan) to thereby obtain polyurethane strands. Further, the polyurethane strands were formed into pellets by means of a pelletizer. It was found that the pelletized polyurethane had a number average molecular weight of 80,000 and a gel content of 0% by weight, based on the weight of the polyurethane. A 100 μm-thick sheet of the polyurethane was prepared by subjecting the pellets to compression molding, to thereby obtain test pieces for measurement of resistance to light. However, in the measurement, the test pieces melted, so that the measurement could not be achieved. The results are shown in Table 1.

COMPARATIVE EXAMPLE 6

Substantially the same procedure as described in Comparative Example 5 was repeated except that polyhexamethylene carbonate diol (CARBODIOL D-2000 manufactured and sold by Toa Gosei Chemical Industry Co., Ltd., Japan) was used instead of polytetramethylene carbonate diol, to thereby obtain pellets of polyurethane having a number average molecular weight of 80,000 and a gel content of 0% by weight, based on the weight of the polyurethane. A 100 μm-thick sheet of the polyurethane was prepared by subjecting the pellets to compression molding, to thereby obtain test pieces for measurement of resistance to light. The results of measurement are shown in Table 1.

TABLE 1

| | Polyurethane composition | Number average molecular weight of polyurethane | Resistance to light Discoloration ($\Delta E$ value) | Film strength retention ratio (%) |
| --- | --- | --- | --- | --- |
| Example 7 | HDI/C$_4$-PCDL/ 1,4-BD | 85000 | 1.7 | 75 |
| Example 8 | Hydrogenated MDI/C$_4$-PCDL/ 1,4-BD | 80000 | 1.7 | 75 |
| Example 9 | HDI/C$_4$-PCDL/ 1,4-BD | 40000 | 1.8 | 74 |
| Comparative Example 4 | HDI/C$_4$-PCDL/ 1,4-BD | 20000 | Could not be measured due to melting of samples | |
| Comparative Example 5 | MDI/C$_4$-PCDL/ 1,4-BD | 80000 | 20.5 | 40 |
| comparative Example 6 | MDI/C$_6$-PCDL/ 1,4-BD | 80000 | 23.5 | 45 |

Note 1)
HDI: hexamethylene diisocyanate
hydrogenated MDI: dicyclohexylmethane-4,4'-diisocyanate
MDI: 4,4'-diphenylmethane diisocyanate
C$_4$-PCDL: polytetramethylene carbonate diol
C$_6$-PCDL: polyhexamethylene carbonate diol
1,4-BD: 1,4-butanediol

EXAMPLE 10

2050 parts of polytetramethylene carbonate diol obtained in Example 1 and 6396 parts of dimethylformamide were charged in a reaction vessel provided with a reflux cooling column, a thermometer and a stirrer to obtain a mixture. The obtained mixture was stirred and mixed sufficiently. To the thus prepared mixture were added 524 parts of 4,4'-methylenebis(cyclohexyl diisocyanate)(hydrogenated MDI) and 20 ppm of dibutyltin dilaurate. A reaction was conducted at 80° C. for 3 hours to obtain a prepolymer having terminal NCO groups. To the prepolymer was added 163.06 parts of isophorone diamine (IPDA). The chain extension reaction was conducted for about 2 hours. Then, thereto was added 8.85 parts of dibutylamine as a chain terminator. A reaction was allowed to proceed for 1 hour. The thus obtained polyurethane solution had a solids content of 30% by weight, based on the weight of the solution. The polyurethane had a number average molecular weight of 80,000 and a gel content of 0% by weight, based on the weight of the polyurethane.

The obtained polyurethane solution was coated on a glass board and then, dried at 80° C. for 15 hours. Further, the coated board was dried at 50° C. under a reduced pressure for 4 hours to obtain a 100 μm-thick sheet of the polyurethane. The thus obtained polyurethane sheet was subjected to measurement with respect to the resistance to hydrolysis, oleic acid and alcohol. The results are shown in Table 2.

EXAMPLE 11

Substantially the same procedure as described in Example 10 was repeated except that isophorone diisocyante was used instead of hydrogenated MDI, to thereby obtain a polyurethane solution having a solids content of 30% by weight, based on the weight of the solution. The polyurethane had a number average molecular weight of 80,000 and a gel content of 0% by weight, based on the weight of the polyurethane. The polyurethane solution was coated on a glass board to obtain a 100 μm-thick sheet in substantially the same manner as in Example 10. The thus obtained sheet was subjected to measurement with respect to the resistance to hydrolysis, oleic acid and alcohol. The results are shown in Table 2.

COMPARATIVE EXAMPLE 7

Substantially the same procedure as described in Example 10 was repeated except that polyhexamethylene carbonate diol (D-2000 manufactured and sold by Toa Gosei Chemical Industry Co., Ltd., Japan) was used instead of polytetramethylene carbonate diol, to thereby obtain a polyurethane solution. The polyurethane solution was coated on a glass board to obtain a 100 μm-thick sheet in substantially the same manner as in Example 10. The thus obtained sheet was subjected to measurement with respect to the resistance to hydrolysis, oleic acid and alcohol. The results are shown in Table 2.

COMPARATIVE EXAMPLE 8

Substantially the same procedure as described in Example 10 was repeated except that polycaprolactonediol (PLACCEL 220N manufactured and sold by Daicel Chemical Industries, Ltd., Japan) was used instead of polytetramethylene carbonate diol, to thereby obtain a polyurethane solution. The polyurethane solution was coated on a glass board to obtain a 100 μm thick sheet in substantially the same manner as described in Example 10. The thus obtained sheet was subjected to measurement with respect to the resistance to hydrolysis, oleic acid and alcohol. The results are shown in Table 2.

COMPARATIVE EXAMPLE 9

Substantially the same procedure as described in Example 10 was repeated except that polytetramethylene glycol (PTMG-2000 manufactured and sold by Mitsubishi Kasei Corp., Japan) was used instead of polytetramethylene carbonate diol, to thereby obtain a polyurethane solution. The polyurethane solution was coated on a glass board to obtain a 100 μm thick sheet in substantially the same manner as described in Example 10. The thus obtained sheet was subjected to measurement with respect to the resistance to hydrolysis, oleic acid and alcohol. The results are shown in Table 2.

COMPARATIVE EXAMPLE 10

Substantially the same procedure as described in Example 10 was repeated except that 168.1 parts of isophorone diamine and 2.83 parts of dibutylamine were used. The produced polyurethane solution had a solids content of 30% by weight, based on the weight of the solution. The polyurethane had a number average molecular weight of 250,000. During the reaction, the viscosity of the solution increased, so that it became impossible to conduct stirring.

COMPARATIVE EXAMPLE 11

It was attempted to repeat the same procedure as described in Example 10 except that trimethylolpropane was used instead of IPDA as a chain extender. Soon after a chain extension reaction was started by adding the chain extender, the viscosity of the polyurethane solution rapidly increased. It became impossible to stir the solution since the polymer strongly adhered to a stirring rod.

TABLE 2

| | Polyurethane composition | Number average molecular weight of polyurethane | Resistance to hydrolysis; molecular weight retention ratio (%) | Resistance to oleic acid | | Resistance to alcohol | |
|---|---|---|---|---|---|---|---|
| | | | | Swelling ratio (%) | Strength retention ratio (%) | Swelling ratio (%) | Strength retention ratio (%) |
| Example 10 | hydrogenated MDI/C$_4$-PCDL/IPDA | 80,000 | 99 | 10 | 85 | 10 | 90 |
| Example 11 | IPDI/C$_4$-PCDL/IPDA | 80,000 | 99 | 10 | 87 | 10 | 90 |
| Comparative Example 7 | hydrogenated MDI/C$_6$PCDL/IPDA | 80,000 | 98 | 42 | 23 | 20 | 23 |
| Comparative Example 8 | hydrogenated MDI/PCL/IPDA | 80,000 | 7 | 50 | 15 | (dissolved) | 0 |
| Comparative Example 9 | hydrogenated MDI/PTMG/IPDA | 80,000 | 55 | (dissolved) | 0 | (dissolved) | 0 |
| Comparative Example 10 | hydrogenated MDI/C$_4$-PCDL/IPDA | 250,000 | Could not be measured due to an increased viscosity | | | | |
| Comparative Example 11 | hydrogenated MDI/C$_4$-PCDL/ | — | Could not be measured due to an increased viscosity | | | | |

TABLE 2-continued

| Polyurethane composition | Number average molecular weight of polyurethane | Resistance to hydrolysis; molecular weight retention ratio (%) | Resistance to oleic acid | | Resistance to alcohol | |
|---|---|---|---|---|---|---|
| | | | Swelling ratio (%) | Strength retention ratio (%) | Swelling ratio (%) | Strength retention ratio (%) |
| TMP | | | | | | |

Note)
hydrogenated MDI: dicyclohexylmethane-4,4'-diisocyanate
$C_4$-PCDL: polytetramethylene carbonate diol
IPDA: isophorone diamine
IPDI: isophorone diisocyanate
$C_6$-PCDL: polyhexamethylene carbonate diol
PCL: polycaprolactonediol
PTMG: polytetramethylene glycol
TMP: trimethylolpropane

EXAMPLE 12

The polyurethane solution obtained in Example 10 was coated on a surface of a silicone paper so that a thickness of the dry coating became 45 μm. The coated silicone paper was subjected to heat-drying to thereby obtain a polyurethane film. To this polyurethane film was applied a PTMG two-pack type polyurethane adhesive which was obtained by adding hydrogenated xylylene diisocyanate as a crosslinking agent to a main agent comprised of isophorone diisocyanate (IPDI), polytetramethylene glycol (PTMG-2000 manufactured and sold by Mitsubishi Kasei Corp., Japan), N-(2-hydroxyethyl)propylenediamine, monoethanolamine and hydrazine hydrate in a molar ratio of 20:10:5:4:2. The adhesive was used in a basis weight of 130 g/m² to obtain a 118 μm-thick polyurethane adhesive layer. To this adhesive layer was attached a napped side of a napped cotton fabric as a substrate for a synthetic leather and then, heated at 120° C. for 4 minutes, so that the adhesive was reacted and solidified. Then, the silicone paper as a release paper was removed to obtain a laminate synthetic leather. A longitudinal cross-sectional view of the obtained laminate synthetic leather is shown in FIG. 2. In FIG. 2, numeral 1 designates the substrate of the laminate synthetic leather, numeral 2 designates the polyurethane adhesive layer, and numeral 3 designates the thermoplastic polyurethane film. The properties of the obtained laminate synthetic leather were evaluated. The results are shown in Table 3.

EXAMPLE 13

Substantially the same procedure as described in Example 12 was repeated except that the polyurethane solution obtained in Example 11 was used instead of the polyurethane solution obtained in Example 10, to thereby obtain a laminate synthetic leather. The properties of the obtained laminate synthetic leather were evaluated. The results are shown in Table 3.

COMPARATIVE EXAMPLE 12

Substantially the same procedure as described in Example 12 was repeated except that the polyurethane solution obtained in Comparative Example 7 was used instead of the polyurethane solution obtained in Example 10, to thereby obtain a laminate synthetic leather. The properties of the obtained synthetic leather were evaluated. The results are shown in Table 3.

COMPARATIVE EXAMPLE 13

Substantially the same procedure as described in Example 12 was repeated except that the polyurethane solution obtained in Comparative Example 8 was used instead of the polyurethane solution obtained in Example 10, to thereby obtain a laminate synthetic leather. The properties of the obtained laminate synthetic leather were evaluated. The results are shown in Table 3.

COMPARATIVE EXAMPLE 14

Substantially the same procedure as described in Example 12 was repeated except that the polyurethane solution obtained in Comparative Example 9 was used instead of the polyurethane solution obtained in Example 10, to thereby obtain a laminate synthetic leather. The properties of the obtained laminate synthetic leather were evaluated. The results are shown in Table

TABLE 3

| | Polyurethane composition | Resistance to hydrolysis | Resistance to oleic acid | Resistance to alcohol |
|---|---|---|---|---|
| Example 12 | hydrogenated MDI/$C_4$-PCDL/ IPDA | No change observed | No change observed | No change observed |
| Example 13 | IPDI/$C_4$- PCDL/IPDA | No change observed | No change observed | No change observed |
| Comparative Example 12 | hydrogenated MDI/$C_6$-PCDL/ IPDA | No change observed | Remarkable roughing of the surface | Remarkable roughing of the surface |
| Comparative Example 13 | hydrogenated MDI/PCL/IPDA | Peeling-off of surface layer | Peeling-off of surface layer | Peeling-off of surface layer |
| Comparative Example 14 | hydrogenated MDI/PTMG/ IPDA | Remarkable roughing of the | Peeling-off of surface layer | Peeling-off of surface layer |

TABLE 3-continued

| | Polyurethane composition | Resistance to hydrolysis | Resistance to oleic acid | Resistance to alcohol |
|---|---|---|---|---|
| | | surface | | |

Note)
hydrogenated MDI: dicyclohexylmethane-4,4'-diisocyanate
$C_4$-PCDL: polytetramethylene carbonate diol
IPDA: isophorone diamine
IPDI: isophorone diisocyanate
$C_6$-PCDL: polyhexamethylene carbonate diol
PCL: polycaprolactonediol
PTMG: polytetramethylene glycol

EXAMPLE 14

0.1-denier monofilaments of polyethylene terephthalate (hereinafter referred to as "PET") obtained by a direct spinning method were cut in a length of 3 mm to obtain staple fibers. Separately, 1-denier staple fibers of polyvinyl alcohol (hereinafter referred to as "PVA") cut in a length of 3 mm were prepared. The PET staple fibers and PVA staple fibers were mixed in a weight ratio of 70:30 and then, two very fine fiber-made sheets each having a basis weight of 80 g/m² were obtained by a wet-laid method.

Between these two sheets was inserted a plain weave fabric having a basis weight of 50 g/m² comprised of pre-twisted yarns of 75 deniers/36 PET filaments to form a laminated sheet. The front surface and back surface of the laminated sheet were alternately, repeatedly treated with jets of water having a pressure of 15 kg/cm² ejected from a number of nozzles each having an orifice having an inner diameter of 0.2 mm. With this treatment, the very fine fibers and the plain weave fabric were three-dimensionally entangled with each other to obtain an entangled sheet.

Further, the thus obtained entangled sheet was dried. Both surfaces of the dried entangled sheet was napped by means of a belt sander machine provided with an emery paper having 240 meshes. The back surface of the napped surfaces of this napped, entangled sheet was coated with an aqueous carboxymethyl cellulose (CMC) solution (concentration: from 20 to 30% by weight) by means of a doctor knife to obtain a 0.1 mm thick coat, followed by drying.

Separately, the polyurethane solution obtained in Example 10 was diluted with dimethylformamide so that a solids content of the polyurethane became 15% by weight, based on the weight of the solution. A cell size controlling agent (SF 8427 manufactured and sold by Toray Dow Corning Silicone Co., Ltd., Japan) was added thereto in an amount of 10% by weight, based on the solids content of the above-mentioned polyurethane, to thereby prepare a polyurethane coating composition.

The above-mentioned entangled sheet coated with CMC was impregnated with the polyurethane coating composition. Then, the impregnated sheet was soaked in water at 20° C. to solidify the polyurethane, followed by drying. Then, the thus dried sheet was soaked in a boiling water for 20 minutes to extraction-remove PVA fibers and CMC and then dried to obtain a sheet-like material.

This sheet-like material was dyed, by means of a loco type dyeing machine, with a disperse dye (Sumikaron Red-SBL manufactured and sold by Sumitomo Chemical Co., Ltd., Japan) in an amount of 10% by weight, based on the weight of the sheet-like material and then, subjected to reduction and washing by sodium hydrosulfite in an amount of 5% by weight, based on the weight of the sheet-like material. Next, the washed sheet was impregnated with 1% by weight aqueous dispersion comprised of an acrylate-type antistatic agent (Nicepole FE-18 manufactured and sold by Nikka Chemical Co., Ltd., Japan) and a silicone-type water repellent (Asahi-guard AG-770 manufactured and sold by Asahi Glass Co., Ltd., Japan). The impregnated sheet was squeezed by means of a mangle and then, dried by a pintenter dryer at 140° C. at a 3% overfeed rate for 5 minutes. The weight ratio of the above-mentioned antistatic agent to the water repellent was 1:1.

The thus obtained sheet had a suede-like delicately napped surface and an excellent lighting effect while exhibiting no tack, thus providing an excellent touch. This sheet was evaluated with respect to the resistance to hydrolysis, oleic acid and alcohol. The results are shown in Table 4.

EXAMPLE 15

Substantially the same procedure as described in Example 14 was repeated except that the polyurethane solution obtained in Example 11 was used instead of the polyurethane solution obtained in Example 10, to thereby obtain a sheet-like material. The sheet-like material was evaluated with respect to the resistance to hydrolysis, oleic acid and alcohol. The results are shown in Table 4.

COMPARATIVE EXAMPLE 15

Substantially the same procedure as described in Example 14 was repeated except that the polyurethane solution obtained in Comparative Example 7 was used instead of the polyurethane solution obtained in Example 10, to thereby obtain a sheet-like material. The sheet-like material was evaluated with respect to the resistance to hydrolysis, oleic acid and alcohol. The results are shown in Table 4.

COMPARATIVE EXAMPLE 16

Substantially the same procedure as described in Example 14 was repeated except that the polyurethane solution obtained in Comparative Example 8 was used instead of the polyurethane solution obtained in Example 10, to thereby obtain a sheet-like material. The sheet-like material was evaluated with respect to the resistance to hydrolysis, oleic acid and alcohol. The results are shown in Table 4.

COMPARATIVE EXAMPLE 17

Substantially the same procedure as described in Example 14 was repeated except that the polyurethane solution obtained in Comparative Example 9 was used instead of the polyurethane solution obtained in Example 10, to thereby obtain a sheet-like material. The sheet-like material was evaluated with respect to the resistance to hydrolysis, oleic acid and alcohol. The results are shown in Table 4.

TABLE 4

| Polurethane composition | | Resistance to hydrolysis | Resistance to oleic acid | Resistance to alcohol |
|---|---|---|---|---|
| Example 14 | hydrogenated MDI/C$_4$-PCDL/IPDA | No tack | No tack | No tack |
| Example 15 | IPDI/C$_4$-PCDL/IPDA | No tack | No tack | No tack |
| Comparative Example 15 | hydrogenated MDI/C$_6$-PCDL/IPDA | No tack | Very tacky | Very tacky |
| Comparative Example 16 | hydrogenated MDI/PCL/IPDA | Very tacky | Very tacky | Very tacky |
| Comparative Example 17 | hydrogenated MDI/PTMG/IPDA | Slightly tacky | Very tacky | Very tacky |

Note)
hydrogenated MDI: dicyclohexylmethane-4,4'-diisocyanate
C$_4$-PCDL: polytetramethylene carbonate diol
IPDA: isophorone diamine
IPDI: isophorone diisocyanate
C$_6$-PCDL: polyhexamethylene carbonate diol
PCL: polycaprolactonediol
PTMG: polytetramethylene glycol

BRIEF DESCRIPTION OF THE DRAWINGS

FIG. 1 shows an IR spectrum of the polytetramethylene carbonate diol obtained in Example 1 which is a starting material for preparing the thermoplastic polyurethane of the present invention; and

FIG. 2 shows a longitudinal cross-sectional view of the laminate synthetic leather (prepared in Example 12) obtained by coating a fibrous substrate with the coating composition of the present invention, followed by drying so that the coating becomes the surface film of the laminate synthetic leather. In the FIG. 2, numeral 1 designates a substrate of the laminate synthetic leather, numeral 2 designates a polyurethane adhesive layer, and numeral 3 designates a surface film layer of a thermoplastic polyurethane.

INDUSTRIAL APPLICABILITY

The thermoplastic polyurethane of the present invention has excellent resistance to all of light, hydrolysis, oleic acid and alcohols. Therefore, it can be advantageously used for preparing a coating composition comprising the thermoplastic polyurethane dissolved in an organic solvent therefor, and for preparing a laminate synthetic leather and an impregnation composite artificial leather, which are obtained by processing a fibrous substrate with the coating composition. Further, the novel process for preparing a polytetramethylene carbonate diol in the presence of an acidic compound, which process is another aspect of the present invention, can be advantageously employed for preparing a polytetramethylene carbonate diol which is a starting material for the thermoplastic polyurethane of the present invention, since side reactions can be markedly suppressed by virtue of the use of the acidic compound to enable a desired polytetramethylene carbonate diol to be produced in high yield.

We claim:

1. A thermoplastic polyurethane comprising a prepolymer/chain extender reaction product having a number average molecular weight of from 30,000 to 200,000, and a gel content of 5% by weight or less, based on the weight of said thermoplastic polyurethane; wherein said prepolymer is a prepolymer (A) comprising a reaction product of a polytetramethylene carbonate diol component (1) having a number average molecular weight of from 500 to 10,000 and an excess of an aliphatic diisocyanate component (2), said prepolymer (A) being represented by the following formula:

wherein:
X represents m is a number having an average value of from 3 to 85;

Y represents an aliphatic diisocyanate residue; and n represents a number having an average value of from 1 to 50, and wherein said chain extender is a chain extender (B) having an active hydrogen atom which is selected from the group consisting of a diol having a molecular weight of 300 or less, a diamine have a molecular weight of 300 or less, hydrazine and water.

2. A thermoplastic polyurethane according to claim 1, wherein said aliphatic diisocyanate is at least one member selected from the group consisting of tetramethylene diisocyanate, pentamethylene diisocyanate, hexamethylene diisocyanate, octamethylene diisocyanate, 1-methylcyclohexylene-2,4-diisocyanate, 1,2-dimethylcyclohexylene-ω,ω'-diisocyanate, isophorone diisocyanate and dicyclohexylmethane-4,4'-diisocyanate.

3. A thermoplastic polyurethane according to claim 1, wherein said chain extender (B) is at least one member selected from the group consisting of ethylene glycol, 1,4-butanediol, 1,5-pentanediol, neopentyl glycol, 1,6-hexanediol, ethylenediamine, propylenediamine, hexamethylenediamine, tolylenediamine, xylylenediamine, diphenyldiamine, diaminodiphenylmethane, diaminocyclohexylmethane, piperazine, 2-methylpiperazine, isophoronediamine, hydrazine and water.

4. A coating composition comprising a thermoplastic polyurethane of any one of claim 1 dissolved in an organic solvent therefor.

5. A laminate synthetic leather comprising a fibrous substrate and, directly or indirectly attached to at least one surface thereof, a thermoplastic polyurethane of claim 1 in a film form.

6. An impregnation composite artificial leather comprising a fibrous substrate and, substantially uniformly filled in interstices between fibers thereof, a thermoplastic polyurethane of claim 1, said thermoplastic polyurethane bonding said fibers together.

7. A process for preparing a polytetramethylene carbonate diol represented by the following formula:

wherein p is a number having an average value of from 3 to 85, which comprises reacting 1,4-butanediol with a carbonate selected from the group consisting of a dialkyl carbonate, a diaryl carbonate and an alkylene carbonate in the presence of an acidic compound.

8. A process according to claim 7, wherein said acidic compound is at least one member selected from the group consisting of phosphoric acid, phosphonic acid, a phosphoric ester, a phosphonic ester and an acid phosphoric ester.

9. A process according to claim 7, wherein said acidic compound is employed in an amount of from 1 ppm to 10,000 ppm, based on the total weight of said 1,4-butanediol and said carbonate.

10. A process according to claim 7, wherein said polytetramethylene carbonate diol has a number average molecular weight of from 500 to 10,000.

11. A process for preparing a polytetramethylene carbonate diol having a number average molecular weight of from 500 to 10,000 and represented by the following formula:

wherein p is a number having an average value of from 3 to 85, which comprises reacting a polytetramethylene carbonate diol having a number average molecular weight of from 300 to 1,000 with a carbonate selected from the group consisting of a dialkyl carbonate, a diaryl carbonate and an alkylene carbonate in the presence of an acidic compound.

12. A process for preparing a polytetramethylene carbonate diol having a number average molecular weight of from 500 to 10,000 and represented by the following formula:

wherein p is a number having an average value of from 3 to 85, which comprises subjecting a polytetramethylene carbonate diol having a number average molecular weight of from 300 to 1000 to self-condensation reaction in the presence of an acidic compound.

* * * * *